United States Patent Office 3,373,771
Patented Mar. 19, 1968

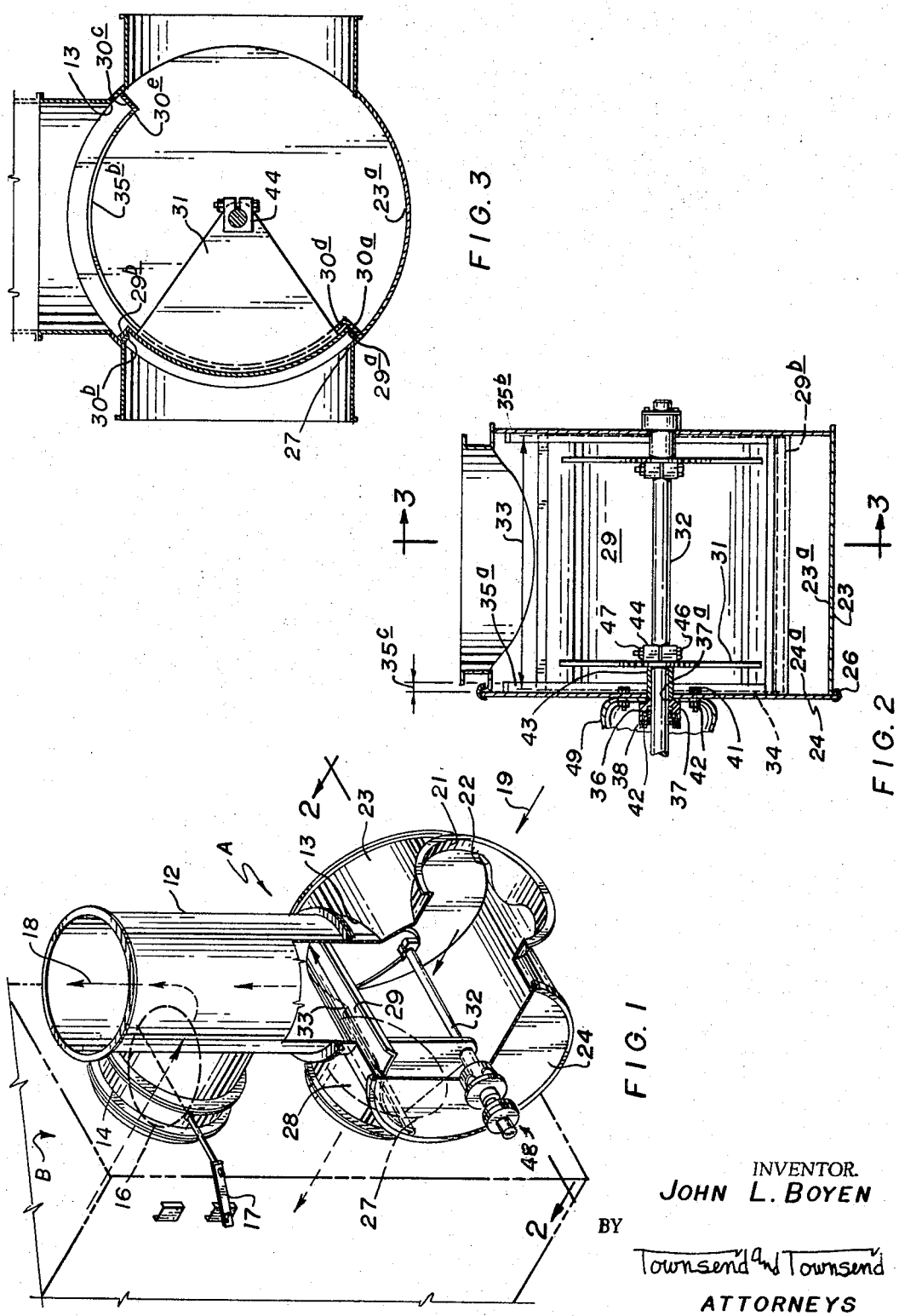

3,373,771
GAS FLOW MODULATOR VALVE
John L. Boyen, Oakland, Calif., assignor to Besler Corporation, Emeryville, Calif., a corporation of California
Filed Apr. 29, 1965, Ser. No. 451,914
6 Claims. (Cl. 137—625.46)

ABSTRACT OF THE DISCLOSURE

A fluid flow modulator valve having a plurality of outlet ports and including a variable positionable baffle plate having a curved surface corresponding to the inner surface of the valve to enable the plate to be aligned in close proximity for closing at least one of the ports. The valve also includes at least one rib for alignment with the plate to provide a fluid-tight seal around at least a portion of the closed port.

---

This invention relates to a gas bypass valve and more particularly to an improved gas modulating and shut-off valve.

Although my invention may be found useful in many applications, it is of particular utility in the water tube boiler shown in my copending application entitled, "Total Energy Conservation System," Ser. No. 419,615, filed Dec. 18, 1964, now abandoned. In that application, for example, I show a water tube heater or boiler designed to generate steam, or other hot fluid, utilizing heat recovered from the tail gases of a conventional gas fired turbine; and the modulator of this invention may be used therein to achieve necessary gas flow control.

In modulating the turbine tail gases or exhaust to control the amount of hot fluid that is generated by heat recovery units of various types, some form of gas valve is required to deflect one portion of the hot exhaust gases into the unit's heat transfer chamber and the balance into a gas bypass and hence up a conventional stack to the atmosphere. Such hot gas deflection may be accomplished in a variety of ways, e.g. by means of a butterfly or damper positioned in the exhaust gas plenum of the waste heat recovery unit and against which the total amount of waste heat gas is impinged. The angle at which such a butterfly or damper is held determines the amount of gas diverted to the heat transfer chamber and hence affects the amount of hot fluid that may be generated at the output of the unit. Such angle, or degree of rotation of the damper with respect to its fully closed or gas bypassed position, may be regulated either manually or by means of automatic controllers responsive to the fluid output pressure or temperature of the unit. However, in using a single butterfly or damper plate, the pressure of the hot gases against the plate on the upstream side of its pivotal axis varies depending upon the angular position of the damper in the gas stream. Hence, control by means of conventional actuators sensitive to fluid output pressure or temperature becomes difficult because the amount of torque that must be applied to move the damper varies as a function of its angular position. This becomes particularly pronounced as the damper plate rotates toward the position of fully closing off the conduit in which it is mounted. Although a complete dynamic analysis of such phenomena are beyond the scope of this specification, it has been found in actual practice that additional compensators are necessary to achieve reasonably good gas emission and bypass control. Moreover, even with such compensators, slight variations in the angle of the damper may affect greatly the hot fluid output, particularly in the critical ranges of gas bypass control, thus sometimes causing the damper and its automatic controller to fluctuate erratically or "hunt."

Certain disadvantages of the single damper or butterfly valve may be overcome by the use of a double butterfly valve arrangement. In this type of design the main center portion of a T-shaped duct is used to receive the turbine tail gases with one branch of the T head being in fluid communication with the heat transfer chamber of the heater or boiler while the other branch serves as the gas bypass to the stack and hence to the atmosphere. Each branch of the T head is provided with a butterfly damper, and the dampers are linked together mechanically so that when the bypass butterfly is fully closed, the gas emission butterfly in the passage to the heat transfer chamber is fully opened, and vice versa. Thus each setting of the linked butterfly dampers determines how much of the total turbine tail gas is emitted to the heat transfer portion of the boiler or water heater and how much to the gas bypass. By interconnecting the butterflies so that they occupy complementary angular positions in their respective ducts, each of which is a branch from the main gas carrying conduit, the total gas pressure resisted by the two dampers working together remains relatively constant. As long as the butterflies remain so coordinated, good gas flow control can be achieved generally because a constant actuator force may be provided without special compensators. However, in the use of such systems difficulty is sometimes encountered in maintaining a correct and constant relationship between the respective positions of the butterflies to provide the desired ratio between gas emission and bypass over the entire operating range of the equipment. This may require a compromise relationship between the two dampers; and even then, if their relative alignment is changed due to mechanical slippage of the linkage between butterflies or heat warpage, not only is the gas emission and bypass ratio upset, but balanced operation no longer is achieved and the system takes on many of the disadvantages of the single damper arrangement described above.

Thus, it is an object of this invention to provide a gas flow modulating valve having a single modulator element to divert hot gases in predetermined amounts to each of two ports and in which the modulator element is subjected to a relatively constant gas flow force particularly in the critical ranges of diversion of gas to one port or the other.

It is another object of this invention to provide a gas modulating valve including a cylindrical shell having a pair of ports formed in the circumferential surface of such shell, and a curved plate rotatably mounted about the longitudinal axis of the cylindrical shell and designed to fit therein with its outer face concentric to the inner surface of the shell. The perimeter of the curved plate is shaped to have one portion coextensive with one of the ports with the plate in one position and a second portion coextensive with the other port when the plate is in another position. The portions are so arranged with respect to each other that while one portion completely covers one of said ports, the other portion leaves the other port unobstructed; and if the curved plate is moved about its axis of rotation, either by manual or automatic means, it passes through a plurality of positions each covering a portion of both parts to a position where the one portion leaves the one port unobstructed and the other portion completely covers the other port.

A feature and an advantage of such a gas modulating shut-off valve is that the forces due to the hot gases impinging upon the curved deflector plate are relatively constant through the critical range of operation of the valve and independent of the plate's rotational position within the cylindrical shell. Consequently, the amount of controlling torque to vary the position of the curved plate, particularly in the critical bypass range, is nearly constant for a given amount of hot gas flow. Accordingly, more effective control, by either manual or automatic means, of gas flow modulation between a gas emission port and a gas bypass port may be achieved using this novel valve.

Another object of this invention is to provide a gas modulating valve including a cylindrical shell with closed ends, a pair of ports of substantially equal cross section formed in the circumferential surface of the shell having centers thereof arranged to lie in a common plane normal to the longitudinal axis of the shell, and a curved plate concentric to the inner circumferential surface of the shell and mounted therein for movement about the shell's longitudinal axis and immediately adjacent to the shell's inner surface. The convex face of the curved plate is also formed to have a radial projection that is coextensive to that portion of the inner circumferential surface which includes one of the ports and the adjacent inner circumferential surface between the ports. Thus the curved plate may be rotated through a series of positions which partially block both of the ports, or one port entirely, thereby providing a complete range of gas flow modulation.

Another feature and advantage of this invention is that by achieving gas diversion to the heat transfer section of a heater unit and its gas bypass with a single rotatable element, a flow modulator valve system is provided using fewer parts than required with the prior art devices with which I am familiar.

Another object of this invention is to provide a gas modulating valve including a cylindrical shell having closed ends, first and second ports of uniform size formed in the surface of the shell, and a curved plate having a radius of curvature slightly less than the radius of curvature of said cylindrical shell. The curved plate is provided with a pair of opposite, parallel, arcuate edges and is mounted in the shell to rotate about the shell's longitudinal axis with the arcuate edges immediately adjacent to the inner surface of the ends of the cylinder and with the face of the curved plate spaced close to the inner circumferential surface of the shell.

A feature and an advantage of the valve structure as described above is that the curved modulator plate may be rotated within the cylindrical shell of the valve body while encountering a minimum of frictional drag.

Another object of this invention is to provide a gas modulating valve of the type described above with a pair of arcuate ribs extending inwardly of the shell body and immediately adjacent to the concave arcuate edges of the modulating plate. In this manner a relatively effective fluid seal is provided between the movable plate portion of the valve and the cylindrical shell itself.

Another object of this invention in the type of flow modulator valve as described above is to provide cross ribs extending radially inwardly from the inner surface of the cylindrical shell parallel to the longitudinal axis thereof. Such cross ribs may be provided at each extremity of the ported section of the shell to provide a relatively fluid tight seal between the flow modulator plate when positioned to block completely either of the two ports. A third cross rib extending radially inwardly from the cylindrical shell and parallel to the longitudinal axis thereof may be provided between the two ports which may also act as a fluid sealing member in conjunction with the flow modulator plate when the latter is in either of its two extreme port blocking positions.

Another feature and an advantage of this invention is that the entire flow modulator device may be contained in a single cylindrical shell body which may be readily secured in operative form to a heater unit that merely requires an input flange to its heat transfer chamber. No additional plenums or chambers are required as is sometimes the case with bypass equipment that must be integrated into the heater unit design from the start, thereby lacking design flexibility such as the ability to be prefabricated in modular units. In the use of my invention, the novel gas flow valve is modular and may be added to an exhaust heat recovery unit at any time, even in the field, with a minimum of alteration or modification to one heater unit itself.

Another advantage of my novel modulator valve is that it is easily adapted to a boiler or heater unit in almost any position. This is so because of the relatively simple duct work involved to connect my valve to the heat transfer chamber and because of the unit's inherently compact design.

Another feature of my invention is that all of the moving portions of the valve, with the exception of the modulator plate itself and a portion of its supporting bar, are accessible from outside of the valve housing. In this way, normal maintenance may be performed with a minimum of cost and down time.

With the construction of the modulating valve in accordance with the present invention movement of the plate which opens and closes the ports of the valve is substantially normal to gas flow through the ports so that movement of the valve plate is substantially unaffected by any change in the force of the gas flow. The forces producing movement of the plate do not buck gas flow forces so that the plate is operable with a constant torque.

Other objects, features and advantages will become apparent upon a reading of the detailed specification which follows and referring to the accompanying drawings wherein similar characters of reference in the several views refer to corresponding elements.

Turning now to the drawings:

FIG. 1 is an isometric view with certain sections cut away to show my novel valve structure and with certain details omitted for purposes of clarity of illustration;

FIG. 2 is a sectional elevation taken along line 2—2 of FIG. 1, including certain details not shown in FIG. 1; and FIG. 3 is a sectional side elevation taken along line 3—3 of FIG. 2.

This invention embodies a valve housing, such as that indicated generally at A in FIG. 1, for the controlled diversion of hot gas into one or two ports, 13 or 27, formed in the surface of cylindrical shell or enclosure 23 into which the hot gas is introduced. The gases thus diverted into each of the two ports may then be conveyed to separate areas of usage or discharge.

More particularly, the cylindrical shell in which the aforementioned ports are formed is provided with curved pltae 29 whose curvature at its outer face is concentric to that of the inner circumferential surface of the cylindrical shell. The curved plate is rotatably mounted on cross bar 32 within the cylinder and may be caused to occupy a plurality of positions which partially and simultaneously cover and uncover each of the two ports. In this way hot gas, which has been conveyed into the shell via inlet port adatper 21, is caused to flow therefrom in varying proportions through each of the two ports 13 and 27, or either of them when the other is completely closed.

The valve body indicated generally at A in FIG. 1 is shown connected for operation to a heater or boiler indicated generally at B which may be of a type similar to that shown in my copending patent application referred to earlier. In the arrangement shown, gas bypass conduit 12 connects boiler or exhaust conduit 14 in fluid communication with bypass port 13 of the novel valve itself, although it is understood that the gas bypass conduit is not a part of the valve. Exhaust conduit 14 is provided with its own damper 16 having manual adjusting crank 17 shown in the open position so that the gas bypass from by flow modulator valve may be combined with the boiler or heater gas exhaust which together are then conveyed upwardly in the direction of arrow 18 through a conventional stack, not shown, to the atmosphere. In the description that follows, the foregoing arrangement is used for purposes of illustration and explanation of my valve wherein it is also assumed that hot tail gases from a conventional gas turbine are conveyed by means of a conduit (not shown) in the direction of arrow 19 through inlet portion adapter 21 which is provided with a securing flange for connection to valve inlet port 22 at one side of cylindrical shell 23. Unless otherwise noted, the shell, modulator plate and other valve components may be fabricated from sheet steel, bar stock or other suitable material.

Cylindrical shell 23 is closed at each of its ends by means of closure pltaes 24, which are of a circular shape and may be secured to the edges of the cylindrical shell by means of seam slip 26 or other known expedients. Gas emission port 27 is formed in the cylindrical shell directly opposite inlet port 22 and is suitably joined about its periphery to gas emission conduit 28 which, in turn, is in fluid communication with the heat transfer chamber of the boiler or heater indicated generally at B.

Referring to FIGS. 2 and 3, curved modulator plate 29 is shown welded or otherwise suitably secured to the outer edges of radially extending, pie-shaped supports 31 which in turn are attached to cross bar 32 by means of split bosses 44, which are welded or otherwise suitably secured to each modulator plate support. Bosses 44 are drawn together by means of bolts 46 and nuts and lockwashers 47 to maintain a frictionally secure connection to cross bar 32 whose longitudinal axis is coincident with such axis of cylindrical shell 23. Width dimension 33 of plate 29 is selected so that arcuate edges 34 of the modulator plate extend to within about ⅛ inch of inner surface 24a of each of end plates 24. The modulator plate is also formed to have axially aligned, radially extending lips 29a and 29b whose straight edge extremities are within about ⅛ inch of the inside circumferential wall surface 23a of cylindrical shell 23.

When the modulator plate is in its extreme position closing off port 27, the outer surface of radially extending, axially aligned lip 29a is caused to contact the inner surface of radially extending, axially aligned cross rib 30a which is welded or otherwise suitably secured to inner circumferential surface 23a along a line nearly tangent to the lower extremity of port 27 and parallel to the longitudinal axis of cylinder 23. In addition, cross rib 30a is formed to have lip 30d which overlies plate 9 along its entire width with about ⅛ inch clearance, directly opposite lip 29a. Thus a relatively gas tight seal is formed which prevents seepage of gas about edge 29a of the modulator plate when it fully closes off port 27. The distance between modulator plate lips 29a and 29b is formed so that when lip 29a is in contact with rib 30a, the inner surface of radially extending, axially aligned lip 29b is caused to contact one side of cross rib 30b, which is also welded or otherwise suitably secured to surface 23a along a line about midway between ports 13 and 27 and parallel to the longitudinal axis of cylinder 23. Rib 30b extends radially inwardly to within about ⅛ inch of the outer circumferential surface of modulator plate 29 so that a relatively gas tight seal is formed that prevents seepage of gas about edge 29b of the modulator plate in position fully closing off port 27.

When modulator plate 29 is moved to completely open port 27 and block port 13, the inner surface of radially extending lip 29a is caused to contact one side of rib 30b while the outer surface of lip 29b bears against the inner radial surface of radially extending, axially aligned cross rib 30c. Rib 30c is similar in all respects to rib 30a except that it is nearly tangent to the extremity of port 13 away from port 27, and its lip portion 30e overlies modulator plate lip 29b when plate 29 closes off port 13. Thus a relatively gas tight seal is also formed about modulator plate straight edges 29a and 29b when modulator plate 29 is in position closing off port 13.

In addition, a pair of arcuate ribs 35a and 35b, whose inner and outer surfaces are concentric to the circumferential surface of cylinder 23 but with a radius of curvature slightly less then that of plate 29, are welded or otherwise suitably secured to each of end walls 24 between and abutting to inwardly extending lips 30d and 30e. Arcuate portions 35a and 35b extend axially inwardly from ends 24 a relatively short distance 35c. Therefore, when the modulator plate is in any of its operating positions, the close clearance and labyrinthal relationship between arcuate edges 34 of modulator plate 29, end wall inner surface 24a, and arcuate ribs 35a and 35b prevents any significant amount of gas seepage around the arcuate edges of the modultaor plate and compels any gas flow to occur through those portions of ports 13 and 27 which are unobstructed by the modulator plate.

Modulator plate 29 may be rotated to a plurality of positions within the cylindrical shell of the valve body simultaneously and progressively uncovering one port and covering the other until the one port is completely open and the other completely blocked. Thus turbine exhaust, or other hot waste gases, entering through inlet port 22 may be diverted either wholly through port 27 or port 13, or in varying ratios therebetween, depending upon the position of the modulator plate.

It should also be noted that in the embodiment of my invention as shown, both ports to be modulated are of the same cross sectional shape and area. As the modulator plate progresses from a position fully obstructing bypass port 13 through steps towards fully obstructing gas emission port 27, and fully uncovering bypass port 13, the force of gas pressure against plate 29 remains relatively constant particularly through the critical zones of operation. Consequently, the amount of torque necessary to control the movement of the modulator plate remains relatively constant irrespective of its rotational position particularly in the critical operating zones. This is in contrast to the butterfly or damper plate type valves which, as explained hereinabove, exhibit relatively nonlinear modulator torque requirements. Consequently, the control of my novel flow modulator valve is more easily provided than that for prior art modulators such as the damper or butterfly valve.

As can be seen in FIG. 2, cross bar 32 extends through the cylindrical shell and is supported at or near each of its ends by means of bearings, bushings, or the like, 36 mounted in housing 37 and retained therein by means of closure plate 38 and cap screws and lock washers 42. Spacer bushing 43 of some suitable material such as, for example, bronze, is disposed between counterbore 37a of each of the housings 37 and the outer face of adjacent modulator plate support 31, the two spacer bushings maintaining the entire modulator assembly in proper alignment within the cylindrical shell. By maintaining such alignment, cross bar 32 may actuate the modulator plate to a plurality of positions in a smooth and relatively friction-free manner.

At one side of the cylindrical shell, as indicated at the left-hand side of FIG. 1, there may be provided an air operated or other suitable actuator indicated at 48 which is operably secured to the end of cross bar 32 which projects through support housing 49 for controlling the position of plate 29. Such actuator may be controlled by steam pressure at the outlet header of the boiler or heater unit, or by a water temperature controller, so that at a predetermined signal from either of such sensing devices the modulator plate may be shifted to divert more or less exhaust gas into the heat transfer chamber of the boiler or heater unit indicated generally at B. The bypassed gas may then be combined with the boiler or heater gas exhaust and emitted through a stack to the atmosphere as mentioned earlier.

It is evident that the air operated valve actuator or other automatic sensing device may be entirely replaced by a manual control similar to that shown in FIG. 1 for the exhaust gas shut-off. It is also understood that although I show my valve applied to a boiler or heater of a type similar to that shown in my copending patent application mentioned earlier in this specification, the valve may be used in other places where a proportionate diversion of gas between two ports is desirable.

Although the foregoing specification and accompanying drawings describe one embodiment of my novel gas flow modulating valve, it is understood that many variations are possible. For example, it may be desirable under certain circumstances to provide ports to be modulated in the cylindrical shell of the valve body having different cross sectional areas. It is also contemplated that ports having rectangular or other cross sectional shapes may be used in order to obtain a more linear modulation with equal amounts of movement of the modulator plate. It is also understood that more than two ports may be spaced apart by radial angles other than those indicated in the present specification, and that gas access may be made through the end plates of the cylindrical valve body rather than through the gas inlet port shown. It is also evident that gas flow may occur into one of the modulated port openings. These and many other modifications may be made within the spirit of my invention and scope of the appended claims.

What is claimed is:

1. A valve for selectively directing fluid through a plurality of ports comprising: a main body including a cylindrical shell having at least a pair of spaced-apart ports formed in the circumferential surface of said cylindrical shell; at least an inner rib member mounted on the inner surface of said shell between said spaced-apart ports parallel to the longitudinal axis of said shell; a baffle plate coaxially mounted within said cylindrical shell and having an outer surface corresponding in configuration to inner surface of said shell, said plate juxtaposed the inner surface of said cylindrical shell; at least a portion of said outer surface being coextensive with one of said ports when said plate is in a first position and with the other of said ports when said plate is in a second position; said plate including a pair of flanges extending radially outwardly from opposite, parallel straight edges thereof into close proximity with the inner surface of said cylindrical shell; one of said flanges abutting said rib member when said plate is in said first position and the other of said flanges abutting said rib member when said plate is in said second position, said plate being of insufficient cross section to be simultaneously coextensive with said first and second ports; and means for rotating said plate to a plurality of positions extending between said first position and said second position.

2. A valve in accordance with claim 1 and further characterized by a pair of outer rib members mounted on the inner surface of said cylindrical shell and parallel with the longitudinal axis thereof, said outer rib members extending radially inwardly into said cylindrical shell a distance at least as great as the distance between said baffle plate and the inner surface of said shell, said outer rib members being spaced from said inner rib member a distance sufficient so that when said plate is in a first position, one of said flanges will abut said inner rib member and the other of said flanges will abut one of said outer rib members, and when said plate is in said second position, said other flange will abut said inner rib member and said one flange will abut the other of said outer rib members whereby fluid flow within said valve will be substantially completely eliminated through that port having said plate coextensive therewith.

3. A valve in accordance with claim 1 wherein said one port and said other port are of circular cross section and said flanges are spaced apart a distance corresponding to about the chord distance between the centers of said one port and said other port.

4. A valve in accordance with claim 1 and further characterized by a pair of parallel end plates closing the ends of said cylindrical shell; an arcuate rib secured to the inner surface of each of said end plates and extending inwardly of said cylindrical shell a distance at least as great as about one-half the difference between said end plates and the opposed arcuate edges of said baffle plate, each said arcuate rib having a convex surface whose radius of curvature is slightly less than the radius of curvature of said plate, and each said arcuate rib being in axial alignment with the other to define a curved plane adjacent to the inner surface of said shell.

5. A gas modulating valve comprising: a main body having at least a semicylindrical wall portion, said wall portion having a pair of ports therein spaced apart by a circumferential interval; at least one rib mounted on the inside surface of said wall portion in the smallest said circumferential interval between said ports and parallel with the longitudinal axis of the wall; a semicylindrical plate shaped to fit within said main body and having a longitudinal axis coaxial with the longitudinal axis of said wall portion, means for mounting said plate within said main body with the outer surface of the plate immediately adjacent said rib, said plate including at each a pair of opposite, parallel, straight edges a flange extending radially outwardly immediately adjacent the inner surface of said wall portion, and the size of said plate being such that a radial outward projection of said plate onto said wall portion covers one of said ports and the adjacent interval of said wall portion between the ports; means at the longitudinal axial extremities of said plate substantially closing off access from within said valve to the region between said plate and said wall portion; means for moving said plate to a plurality of positions each characterized by said radial outward projection covering at least a portion of at least one of said ports; and means providing fluid communication between said main body and a source of fluid to direct a flow of fluid into said shell for discharge through the uncovered portions of said ports.

6. The gas modulating valve in accordance with claim 5 and wherein further a pair of second ribs mounted in the inside surface of said wall portion and parallel with the longitudinal axis thereof, one of said second ribs positioned on one side of one of said ports away from said one rib and the other second rib positioned on one side of the other of said ports away from the one rib, each of said second ribs extending radially inwardly into said main body a distance at least as great as the distance between said flange and the inner surface of said wall portion, and each of said second ribs spaced apart from said one rib a distance equal to the distance from the inside radial surface of one of said flanges to the outside radial surface of the other.

References Cited

UNITED STATES PATENTS

| | | | |
|---|---|---|---|
| 763,724 | 6/1904 | Collis | 137—625.46 |
| 806,268 | 12/1905 | Koontz | 137—610 |

FOREIGN PATENTS 171,863  7/1952  Austria.

M. CARY NELSON, *Primary Examiner.*

J. R. DWELLE, *Assistant Examiner.*